United States Patent [19]

Lindstrom

[11] Patent Number: 4,544,466
[45] Date of Patent: Oct. 1, 1985

[54] PROCESS OF MAKING U.V. CURED POLYURETHANES USING DIAZONIUM SALT PROMOTERS

[75] Inventor: Merlin R. Lindstrom, Bartlesville, Okla.

[73] Assignee: Phillips Petroleum Company, Bartlesville, Okla.

[21] Appl. No.: 558,650

[22] Filed: Dec. 6, 1983

[51] Int. Cl.$^4$ .............. C08G 18/16; C08G 18/28; C08G 18/08; C08G 71/04

[52] U.S. Cl. .............. 204/159.11; 204/159.24; 430/141; 430/163; 430/168; 430/176; 430/177; 430/269; 430/171

[58] Field of Search ............... 430/175, 176, 152, 168, 430/163, 269, 141, 177, 171, 906; 204/159.11, 159.24

[56] References Cited

U.S. PATENT DOCUMENTS

| | | |
|---|---|---|
| 2,739,889 | 3/1956 | Neugebauer et al. ............ 430/175 |
| 3,235,382 | 2/1966 | Neugebauer et al. ............ 430/175 |
| 3,457,071 | 7/1969 | Notley et al. ............ 430/176 |
| 3,552,961 | 1/1971 | Notley et al. ............ 430/176 |
| 3,711,390 | 1/1973 | Feinberg ............ 430/176 |
| 3,711,391 | 1/1973 | Feinberg ............ 430/176 |
| 3,954,584 | 5/1976 | Miyata et al. ............ 204/159.24 |
| 4,092,172 | 5/1978 | Higuchi ............ 430/906 |
| 4,186,017 | 1/1980 | Palmer ............ 430/175 |
| 4,272,603 | 6/1981 | Chenevert ............ 430/152 |
| 4,289,838 | 9/1981 | Rowe et al. ............ 430/176 |
| 4,337,307 | 6/1982 | Neubauer ............ 430/176 |
| 4,343,885 | 8/1982 | Reardon ............ 430/177 |
| 4,483,759 | 11/1984 | Szycher et al. ............ 204/159.11 |
| 4,506,003 | 3/1985 | Ruckert et al. ............ 430/271 |

FOREIGN PATENT DOCUMENTS 975456  2/1961  United Kingdom ............ 430/152

OTHER PUBLICATIONS

Kosar, J., "Light-Sensitive Systems", J. Wiley & Sons, 1965, pp. 194–197.
Noller, C. R., "Textbook of Organic Chemistry", 2nd Ed., W. B. Saunders Co., 1958, p. 341.

*Primary Examiner*—Charles L. Bowers, Jr.

[57] ABSTRACT

A process for the rapid curing of polyurethanes comprising the steps of (a) mixing together a diisocyanate compound, a diol, a polyol, and a diazonium salt and thereafter (b) exposing the resulting mixture to ultraviolet light in the wavelength range of about 2000 to about 4000 Angstroms for a period of about 0.1 second to about 20 minutes at a temperature in the range of about 0° F. to about 180° F.

6 Claims, No Drawings

PROCESS OF MAKING U.V. CURED POLYURETHANES USING DIAZONIUM SALT PROMOTERS

This invention relates to a process for the rapid curing of polyurethane compounds in the presence of ultraviolet light sensitive diazonium salt compounds.

The reaction of diisocyanates, diols, and polyols to form polyurethane compounds is well known. Furthermore, the addition of such promoters as tin salts and tertiary amines to the urethane reaction mixture is also known. The disadvantage of using these reaction promoters, though, is that they promote almost instantaneous curing of the urethane which is not always desirable. Instead, it may be more desirable to add the reaction promoter with urethane curing achieved later on.

Therefore, it is an object of this invention to provide a rapid, efficient process for the curing of polyurethane compounds yet which does not take place almost immediately when a promoter is added to the urethane reaction mixture.

Other aspects, objects, and advantages of the present invention are apparent from the specification and claims.

In accordance with the present invention, I have discovered that in a process wherein hydroxy-containing hydrocarbons and diisocyanates are reacted to form urethane polymers, an improvement is made in the curing process by the addition of ultraviolet light activated diazonium salts to the reaction mixture. In this manner, curing is not achieved until the reaction mixture is exposed to ultraviolet light sufficient to affect activation of the diazonium salt compound. This contrasts sharply with the situation wherein undesired instantaneous curing is achieved with the addition of certain tin salts and tertiary amines to the reaction mixture.

Briefly, the process of my invention comprises the steps of (a) mixing together a diisocyanate compound, a diol, a polyol, and a diazonium salt compound and then thereafter (b) exposing the resulting mixture to ultraviolet light.

The diisocyanate compounds useful in the present invention are those represented by the formula OCN—R—NCO wherein R is a $C_4$ to $C_{12}$ alkylene, arylene, alkarylene, or aralkylene radical.

Exemplary of such diisocyanate compounds include 2,4-toluene diisocyanate, 2,6-toluene diisocyanate, polymethylene polyphenyl isocyanate, hexamethylene diisocyanate, 4,4'-methylene bis(cyclohexyl isocyanate) and mixtures thereof. Presently preferred are 4,4'-methylene bis(cyclohexyl isocyanate), and mixtures of 2,4- and 2,6-toluene diisocyanate.

Any suitable diol may be used in the present invention such as 1,4-butane diol, polypropylene glycol, and hydroxy-terminated polyesters and mixtures thereof.

Additionally, any suitable polyol may be used in the present invention as well. Exemplary of such polyols are trimethylolpropane, pentaerythritol, glycerol, 1,4,6-hexanetriol, polyether polyols such as those derived from 1,2,6-hexanetriol and propylene oxide and mixtures thereof.

The diazonium salts useful in the present invention are those represented by the formula:

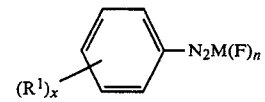

wherein $R^1$ represents an electron withdrawing group (preferably either F, Cl, Br, I, or $NO_2$), M is an element selected from the group consisting of B, P, As, Sb, Bi, and Sn, n is 4, 5, or 6, and x is 1, 2, or 3.

Examples of such diazonium salts are:
p-chlorobenzenediazonium tetrafluoroborate
p-chlorobenzenediazonium hexafluorophosphate
p-bromobenzenediazonium hexafluorophosphate
p-fluorobenzenediazonium hexafluorophosphate
p-iodoenzenediazonium hexafluoroarsenate
p-nitrobenzenediazonium hexafluoroarsenate
p-nitrobenzenediazonium tetrafluoroborate
p-nitrobenzenediazonium hexafluoroarsenate
2,4-dichlorobenzenediazonium tetrafluoroborate
2,4-dibromobenzenediazonium hexafluoroarsenate
2,4-dichlorobenzenediazonium hexafluorophosphate
2,4-dichlorobenzenediazonium pentafluorostannate
2,4-dichlorobenzenediazonium hexafluorobismate
2,4,6-trichlorobenzenediazonium tetrafluoroborate
2,4,6-trichlorobenzenediazonium hexafluorophosphate
2,4,6-trichlorobenzenediazonium hexafluoroarsenate
2,4,6-trichlorobenzenediazonium hexafluoroantimonate
2,4-dinitrobenzenediazonium pentafluorostannate
2,6-dichlorobenzenediazonium hexafluoroborate
and mixtures thereof.

The synthesis of diazonium salts is well known in the art. Generally, it involves the reaction of a primary aromatic amine, $NaNO_2$, and a mineral acid at a temperature usually in the range of about 0° C. to about 25° C.

In the present invention, the amount of diazonium fluoro compound employed is generally about 0.5 to about 5 weight percent based on the total weight of the isocyanate/diol/polyol/diazonium salt mixture.

Generally, the same approximate number of equivalents of diisocyanate should be employed as the total hydroxy equivalent amount of the diol and polyol.

After thorough mixing of the above ingredients, the above mixture is exposed to ultraviolet light, generally in the wavelength of about 2000 to about 4000 Angstroms to effect curing of the polyurethanes. Such light is available from sunlight and from many different commercial lamps including mercury vapor lamps, UV fluorescent lamps, and the like.

Conditions of exposure to ultraviolet light under which the desired product is obtained are generally exposure of about 0.1 second to about 20 minutes at a temperature in the range of about 0° F. to about 180° F., preferably about 1 minute to 5 minutes at a temperature in the range of about 75° F. to about 140° F.

The cured compounds of this invention are useful as resins in both the paint and ink industries.

The following examples further illustrate the present invention.

EXAMPLE I

This example describes the general procedure used to synthesize the diazonium compounds disclosed herein.

p-Chlorobenzenediazonium tetrafluoroborate was prepared as follows: To an 800 milliliter beaker was added 60 milliliters of concentrated hydrochloric acid and 60 milliliters of water followed by 12.75 grams (0.1 mole) of p-chloroaniline. The mixture was then cooled in a wet-ice bath and diazotized with 14 grams (0.2 mole) sodium nitrite dissolved in 24 milliliters of water. This solution was then filtered and the filtrate added slowly with a high rate of stirring to 34 grams (0.3 mole) of sodium tetrafluoroborate dissolved in 60 milliliters of water. The resultant mixture was stirred for an additional 5 minutes and then filtered. The residue was washed with 100 milliliters of distilled water which dissolved away about 50 percent of the product. The remaining material was dried for 4 hours at ambient room temperature and stored in a vacuum desiccator until used.

Additional similar diazonium compounds were prepared in the same manner. These compounds are listed in Table I.

TABLE I

Preparation of Aromatic Diazonium Fluoro Compounds

| Compound | Basic Ingredients | | Product |
|---|---|---|---|
| | Amine | Fluoro-Salt | |
| 1 | p-Chloroaniline | NaBF$_4$ | p-Chlorobenzenediazonium tetrafluoroborate |
| 2 | p-Chloroaniline | NaPF$_6$ | p-Chlorobenzenediazonium hexafluorophosphate |
| 3 | p-Nitroaniline | NaAsF$_6$ | p-Nitrobenzenediazonium hexafluoroarsenate |
| 4 | p-Nitroaniline | NaBF$_4$ | p-Nitrobenzenediazonium tetrafluoroborate |
| 5 | p-Nitroaniline | NaPF$_6$ | p-Nitrobenzenediazonium hexafluorophosphate |
| 6 | 2,4-Dichloroaniline | NaBF$_4$ | 2,4-Dichlorobenzenediazonium tetrafluoroborate |
| 7 | 2,4-Dichloroaniline | NaPF$_6$ | 2,4-Dichlorobenzenediazonium hexafluorophosphate |
| 8 | 2,4,6-Trichloroaniline | NaBF$_4$ | 2,4,6-Trichlorobenzenediazonium tetrafluoroborate |
| 9 | 2,4,6-Trichloroaniline | NaPF$_6$ | 2,4,6-Trichlorobenzenediazonium hexafluorophosphate |
| 10 | 2,4,6-Trichloroaniline | NaAsF$_6$ | 2,4,6-Trichlorobenzenediazonium hexafluoroarsenate |

EXAMPLE II

This example describes a qualitative determination of the sensitivity of substituted benzenediazonium polyfluoro compounds in a typical isocyanate/polyol reaction and illustrates that unlike other catalysts the diazonium compounds do not catalyze the isocyanate/polyol reactions unless subjected to ultraviolet light.

A mixture of 13.1 grams (0.1 equivalent) of Hylene W 4,4'-methylene bis(cyclohexyl isocyanate), 3.60 grams (0.08 equivalent) of 1,4-butenediol and 1.02 grams (0.02 equivalent) of trimethylolpropane were mixed and placed in a test tube to which was then added 0.35 gram of a catalyst assumed to be dibutyltindilaurate. This catalyst was prepared in-situ from 0.17 gram (0.0006 mole) dibutyltin dichloride, 0.13 grams (0.0006 mole) of p-chlorobenzenediazonium tetrafluoroborate, and 0.11 gram (0.0006 mole) of lauric acid. The isocyanate/polyol/catalyst mixture cured to a hard foamy material within 10 minutes of mixing.

The procedure was repeated except the catalyst in-situ mixture was replaced with only 0.17 gram (0.0006 mole) dibutyltin dichloride. Again the isocyanate/polyol/catalyst mixture cured to a hard foamy material in 10 minutes.

Again the procedure was repeated except the catalyst consisted of only 0.13 gram (0.0006 mole) p-chlorobenzenediazonium tetrafluoroborate. The isocyanate/polyol/catalyst mixture did not cure at ambient room temperature in over 3 hours. The mixture was then irradiated with a 4 inch 100 Watt/inch Hanovia ultraviolet light whereupon some curing took place. Heating to about 150° F. (66° C.) and irradiating for 6 minutes resulted in about one-half the solution being cured. The cured material had a dark cherry red color.

These results which are summarized in Table II show the p-chlorobenzenediazonium tetrafluoroborate useful as a catalyst that is activated upon exposure to ultraviolet light.

TABLE II

Effect of Catalyst on a Isocyanate/Polyol Reaction 13.1 g (0.1 eq.) 4,4'-methylene bis(cyclohexyl isocyanate)
3.6 g (0.08 eq.) 1,4-butanediol
1.02 g (0.02 eq.) trimethylolpropane

| Run No. | Catalyst | Results |
|---|---|---|
| 1 | 0.35 g In-Situ dibutyltin dilaurate (0.17 g dibutyltin dichloride 0.11 g lauric acid 0.13 g p-chlorobenzenediazonium tetrafluoroborate) | 1. Cures to hard foamy material in 10 minutes. |
| 2 | 0.17 g dibutyltin dichloride | 2. Cured to hard foamy material in 10 minutes. |
| 3 | 0.13 g p-chlorobenzenediazonium tetrafluoroborate | 3. Does not cure in 3 hours. Partial cure after U.V. exposure. |

EXAMPLE III

This example describes the procedure used to evaluate the diazonium fluoro compounds as catalysts for the isocyanate/polyol curing reaction.

The isocyanate, polyols and catalyst were mixed and placed in a quartz test tube. The contents were then exposed to ultraviolet light (4 inch 100 watt/inch Hanovia lamp) for the various times. The temperature of the liquid rose to about 150° F. (66° C.) due to the heat from the lamp. After 1 minute exposure time, the solution was cooled, transferred into a Soxhlet extractor through which refluxing acetone passed for about 8 hours. The remaining solid material was filtered, dried and weighed to determine the amount of polymerization that had occurred. This value was reported as % Polymerization. The process was repeated at 3, 5 and 10 minute exposure times.

These results are listed in Table III and indicate the best catalysts are those based on hexafluoro phosphorous (Runs 2, 5, 7 and 9) followed by those based on hexafluoro arsenic (Runs 3 and 10) followed by those based on tetrafluoro boron (Runs 6, 1, 4 and 8).

TABLE III

Effect of Diazonium Fluoro
Compounds on Isocyanate/Polyol Polymerization (Curing)

Formulation: 13.1 grams (0.1 eq.) Isocyanate[a]
3.6 grams (0.08 eq.) 1,4-Butanediol
1.02 grams (0.02 eq.) Trimethylolpropane
0.18 gram Diazonium Catalyst

| No. | Diazonium Catalyst | % Polymerization at Various U.V. Exposure Times[b] | | | |
|---|---|---|---|---|---|
| | | 1 min. | 3 min. | 5 min. | 10 min. |
| 1 | p-Chlorobenzenediazonium tetrafluoroborate | 0 | 1.7 | 36.1 | 36.8 |
| 2 | p-Chlorobenzenediazonium hexafluorophosphate | 2.6 | 12.2 | 75.5 | 72.8 |
| 3 | p-Nitrobenzenediazonium hexafluoroarsenate | — | 57.7 | 66.0 | 65.6 |
| 4 | p-Nitrobenzenediazonium tetrafluoroborate | 1.0 | 36.3 | 44.1 | 31.2 |
| 5 | p-Nitrobenzenediazonium hexafluorophosphate | 1.1 | 60.9 | 68.6 | 64.6 |
| 6 | 2,4-Dichlorobenzenediazonium tetrafluoroborate | 0.5 | 17.7 | 39.2 | 58.6 |
| 7 | 2,4-Dichlorobenzenediazonium hexafluorophosphate | 1.4 | 71.1 | 64.9 | 66.3 |
| 8 | 2,4,6-Trichlorobenzenediazonium tetrafluoroborate | 0.3 | 2.9 | 26.1 | 39.3 |
| 9 | 2,4,6-Trichlorobenzenediazonium hexafluorophosphate | 1.3 | 52.2 | 59.0 | 65.4 |
| 10 | 2,4,6-Trichlorobenzenediazonium hexafluoroarsenate | 2.5 | 81.5 | 72.6 | 71.1 |
| 11 | Control-No Catalyst | 0.1 | 0.1 | 29.5 | 29.2 |

[a]Hylene W, 4,4'-methylene bis(cyclohexyl isocyanate).
[b]4 in. 100 watt/inch Hanovia U.V. lamp, exposure temp. 150° F. (66° C.).

Reasonable variations and modifications which will be apparent to those skilled in the art can be made in this invention without departing from the spirit and scope thereof.

I claim:

1. In a process for the production of polyurethane compounds by the polymerization reaction of a diisocyanate compound of the formula OCN—R—NCO wherein R is a $C_4$ to $C_{20}$ alkylene, arylene, alkarylene or aralkylene radical with at least one diol and at least one polyol, the improvement which comprises admixing with said diisocyanate compound and said diol and polyol as a catalyst for said polymerization reaction at least one diazonium salt compound of the formula $$(R')_x \text{—} \bigcirc \text{—} N_2M(F)_n$$

wherein R' is any electron withdrawing group, M is one selected from the group consisting of B, P, As, Sb, Bi and Sn, n is 4, 5 or 6, and x is 1, 2 or 3; and thereafter subjecting the resulting reaction mass to ultraviolet light in the wavelength range of about 2000 to about 4000 Angstroms for a period of about 0.1 to 20 minutes at a temperature in the range of about 0° F. to about 180° F.

2. A process according to claim 1 wherein said diisocyanate is 4,4'-methylene bis(cyclohexyl isocyanate).

3. A process according to claim 1 wherein said diol is 1,4-butanediol.

4. A process according to claim 1 wherein said polyol is trimethylopropane.

5. A process according to claim 4 wherein $R^1$ is at least one selected from the group consisting of F, Cl, Br, I and $NO_2$.

6. A process according to claim 1 wherein said diazonium salt compound is employed in an amount in the range of about 0.5 to about 5 weight percent based on the total weight of the mixture of isocyanate, diol, polyol and diazonium salt.

* * * * *